United States Patent [19]
Shepard et al.

[11] 3,934,109
[45] Jan. 20, 1976

[54] LATCH PIVOT FOR LATCH NEEDLE

[75] Inventors: Richard W. Shepard; Albert S. Ashmead, both of Torrington, Conn.

[73] Assignee: The Torrington Company, Torrington, Conn.

[22] Filed: Feb. 7, 1974

[21] Appl. No.: 440,459

Related U.S. Application Data

[62] Division of Ser. No. 265,706, June 25, 1972, Pat. No. 3,850,011.

[52] U.S. Cl. ............................ 219/121 LM; 163/5
[51] Int. Cl.² ............................................ B23K 27/00
[58] Field of Search .. 219/121 LM, 121 L, 121 EM, 219/121 EB; 163/3, 5; 66/121, 122

[56] References Cited
UNITED STATES PATENTS

| | | | |
|---|---|---|---|
| 1,433,123 | 10/1922 | Corey | 163/5 |
| 1,961,430 | 6/1934 | Perret | 163/5 |
| 1,991,140 | 2/1935 | Currier | 163/5 |
| 3,137,340 | 6/1964 | Couste et al. | 163/5 |
| 3,562,009 | 2/1971 | Cranston et al. | 219/121 LM |
| 3,632,398 | 1/1972 | Konig | 219/121 LM |
| R27,772 | 10/1973 | Hanfmann | 219/121 LM |

*Primary Examiner*—C. L. Albritton
*Assistant Examiner*—G. R. Peterson
*Attorney, Agent, or Firm*—Frank S. Troidl

[57] ABSTRACT

This is a knitting machine latch needle. The latch pivot is formed by displacing portions of the walls of the slot so that the displaced portions extend into the pivot hole of the latch. The displaced portions of the walls are fused together by a high energy heat source emitting sufficient energy to either drill a hole through the displaced portions or melt the displaced portions.

4 Claims, 8 Drawing Figures

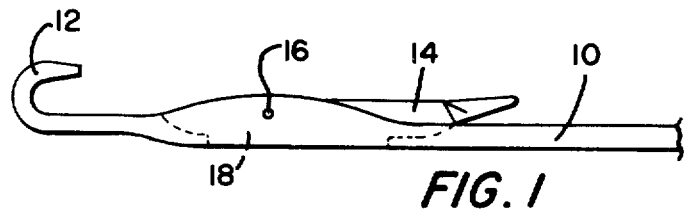
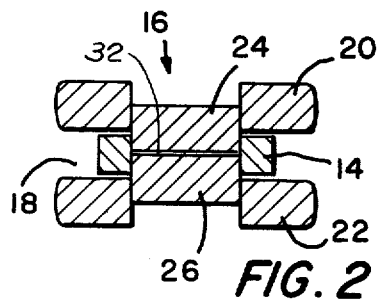
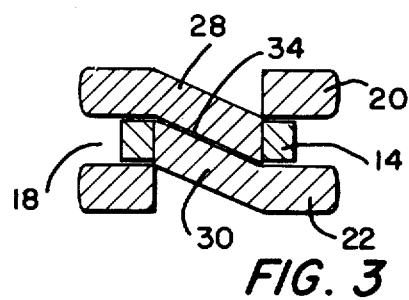
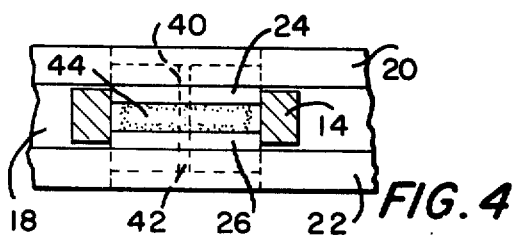
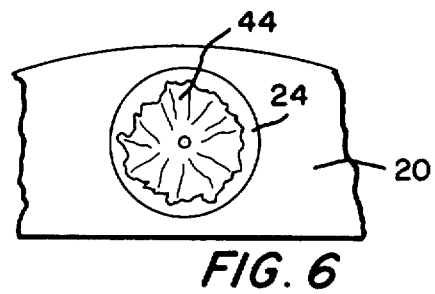
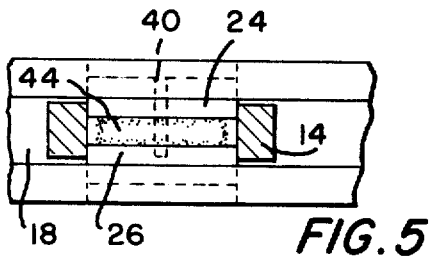
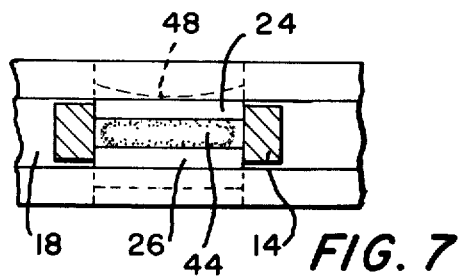
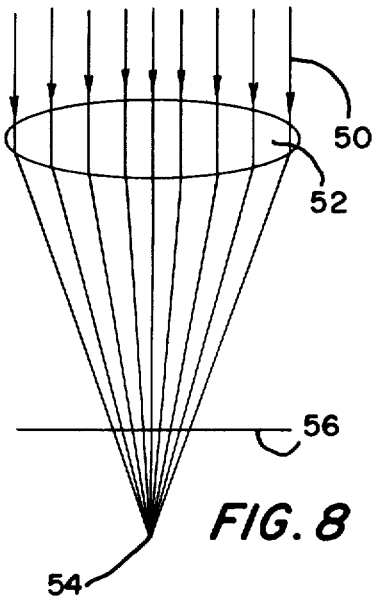

LATCH PIVOT FOR LATCH NEEDLE

This is a division, of application Ser. No. 265,706 filed June 23, 1972, now U.S. Pat. No. 3,850,011.

This invention relates to knitting machine needles. More particularly this invention is a new and improved method for making a latch pivot.

Current methods of making latch pivots include using a pair of punches to displace a portion of the side walls of the blade of the latch needle adjacent the latch slot. The side walls are punched inwardly after the latch is placed into the latch slot and the latch pivot hole is aligned with the punches so the displaced portion of the side walls will extend into the latch pivot hole. The displaced portions may be completely displaced or angularly displaced.

Such currently made latch pivots have many advantages over the old screw rivet type. However, in rough service, high speeds and tight loops, the latch tends to spread the cheeks. This sometimes causes fatigue failures. In addition, the needle may be slightly spread open, leaving the latch with less support then it should have. In tightly arranged knitting elements, such a latch may strike adjacent elements which it should clear. This leads to wear in areas not intended. Also such extra loose latches do not always behave exactly as do properly supported latches. For such reasons, it would be desirable to fuse the two displaced portions together. However, to properly fuse the two parts together is very difficult. This is so, among other things, because the latch is already in place when the two sides of the latch slot are displaced. The latch completely covers the very area you desire to fuse together.

Our invention is a novel method for fusing together the displaced portions after the latch needle is completely assembled with the latch pivotally mounted on the displaced portions.

The invention as well as its many advantages will be further understood by reference to the following detailed description and drawings in which:

FIG. 1 is a side elevational view showing a portion of a typical latch needle;

FIG. 2 is an enlarged sectional view showing a regular pressed latch pivot;

FIG. 3 is a view similar to FIG. 2 but showing an angular pressed latch pivot;

FIG. 4 is a top view, partly in section, of a preferred embodiment of our invention;

FIG. 5 is a top view partly in section showing a second preferred embodiment of our invention;

FIG. 6 is a side elevational view showing the molten metal splash pattern resulting from our invention;

FIG. 7 is a view similar to FIGS. 4 and 5 showing a further modification of our invention and FIG. 8 is a schematic of a laser beam which may be utilized in practicing our new method.

Referring to the drawings, FIG. 1, the latch needle includes a blade 10 with a hook 12 on the end of the blade. The latch 14 pivots about pivot 16 extending transversely across a slot 18.

FIG. 2 is an enlarged sectional view of a regular pressed pivot. The latch pivot is formed by placing the latch 14 with the pivot hole of the latch in the proper position within the slot 18. The sides 20 and 22 of the blade 10 are then punched to form the displaced opposite side portions 24 and 26. The displaced opposite side portions 24 and 26 extend into the pivot hole of the latch 14.

The angular pressed pivot, shown in FIG. 3, is formed by a slightly different shaped punch from the shape of the punch used to form the regular pressed pivot of FIG. 2.

Unfortunately, a space such as space 32 in FIG. 2 or space 34 in FIG. 3 usually exists between the two displaced portions. Spaces 32 and 34 are exaggerated in FIG. 2 and FIG. 3, respectively, for clarity. These spaces usually run from 0.001 to 0.002 inches. The space is caused by the spring back of the metal after the displaced portions are formed by the punch. Previous attempts to weld or fuse the displaced portions together have never been completely satisfactory. Electrical discharge methods often weld segments of the needle not desired, or fail to weld the non-contacting displaced portions. If the needles are mechanically closed together sufficiently to assure contact of the displaced portions, the latch is often so pinched as to retard its motion. Heat sources other than electricity have been tried but none have proved sufficiently accurate or reliable.

Our new method comprises applying controlled heat from a high energy heat source against at least one of the displaced side wall portions to melt at least a portion of the side wall portion so that molten metal forms between the two displaced wall portions. The molten metal is allowed to solidify to fuse the two displaced wall portions together.

Since these latch needles are very small, it is necessary that the heat source be such as to provide the required very well defined and very accurate intense heat source. It is now possible to use certain types of laser beams to provide such required very well defined and very accurate intense heat concentration. One such laser is the Model AO-11 Pulsed Laser made by American Optical Corporation of Southbridge, Massachusetts. It is also possible to use a maser beam. Certain types of electronic beams may also be used.

As shown in FIG. 4 one way of fusing together the displaced portions 24 and 26 is to focus a laser for drilling very fine holes. When the laser is focused to drill fine holes, a small hole 40 extends entirely through the center of displaced portion 24. Also a small hole 42 extends through the center of displaced portion 26. The holes 40 and 42 may be formed by drilling from the outside of the side portions 24 and 26 inwardly or directly through one side portion 24 or 26. The space between the displaced portions 24 and 26 are fused together by the molten metal 44 formed from the metal of the displaced portions. The amount of molten metal 44 is greatly exaggerated in FIGS. 4, 5, and 7 for clarity. The fusion results from a splash of molten metal which is melted by the focused laser beam and boiled out into the space between the parts 24 and 26. The molten metal is then allowed to solidify thus fusing the parts 24 and 26 into one unitary pivot for the latch 14. The shape of the solidified molten metal 44 is shown in FIG. 6.

Holes similar to holes 40 and 42 in FIG. 4 can be made in the displaced portions 28 and 30 of the angular pressed pivot shown in FIG. 3. It is only necessary to focus the laser beam in a direction perpendicular to the outside walls of the angled parts, 28 or 30, or directly perpendicular to side 20 or side 22.

In FIG. 5 instead of penetrating entirely through both displaced portions 24 and 26 the drill hole 40 extends entirely through the portion 24 but then only slightly into portion 26. The fused metal portion 44 pattern is the same as in FIG. 6.

In the embodiment shown in FIG. 7, the laser was focused to melt the metal rather than to drill a hole through the metal. This is done by moving further from the focal point, preferably toward the laser itself. The laser beam is hot enough to melt the metal but lacks sufficient energy to boil the metal. The result is that the inwardly displaced portion 24 which was hit from the outside by the laser beam has a portion of its metal melted and when the metal portion 44 solidifies is fused to the portion 26 leaving a concave shape 48 on the outside of portion 24. If desired, the laser beam could be applied not only to the displaced portion 24 but also against the outside of the displaced portion 26. In such case, a concave surface would also be formed on the outside of the displaced portion 26.

FIG. 8 is a schematic illustration of a laser or maser beam. The parallel rays of light 50 are focused by a lens 52 with the most concentrated energy being at the focal point 54. To drill holes such as holes 40 and 42 in FIG. 4, the displaced portions are placed at the focal point 54 of the laser beam. However, if it is desired not to completely boil the metal but only to melt the metal, the displaced portions are placed along the line 56—56.

We claim:

1. In a method of forming a latch pivot for the latch of a latch needle, having portions of the opposite walls of the slot in the needle displaced into a pivot hole of the latch, with a space between the displaced portions and with spaces separating the latch from each of the opposite walls of the slot, the improvement comprising the steps of: applying controlled heat from a high energy heat source against at least one of said displaced wall portions to at least melt a portion of said displaced wall portion so that molten metal is formed in the space between the two displaced wall portions; the extent of the molten metal being controlled to substantially fill said space without contacting the latch and allowing the molten metal to solidify to fuse the displaced wall portions together without changing the spaces separating the latch from each of the opposite walls of the slot.

2. The method of forming a latch pivot in accordance with claim 1 wherein the molten metal is formed by applying heat of sufficient thermal energy to the outside of said displaced wall portion to make a small hole entirely through said displaced wall portion to form a splash of molten metal between the two displaced wall portions.

3. The method of claim 2 wherein a small hole is formed through both of the displaced wall portions.

4. The method of claim 1 wherein the molten metal is formed by applying against said displaced wall portion a high energy heat beam of sufficient energy to melt at least a portion of said displaced wall portion.

* * * * *